Aug. 30, 1932.  C. F. CHISHOLM  1,874,900
AUTOMOTIVE VEHICLE LUBRICATION
Filed Feb. 4, 1929   2 Sheets-Sheet 1
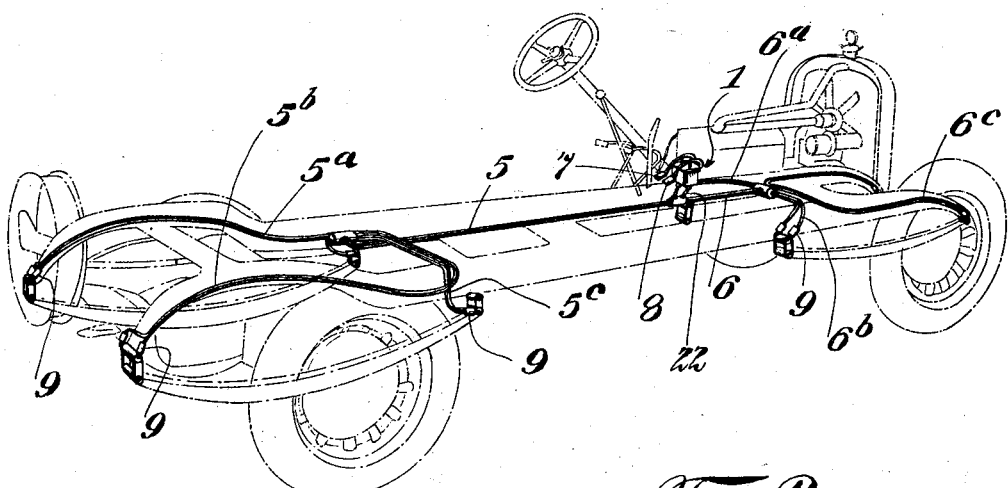
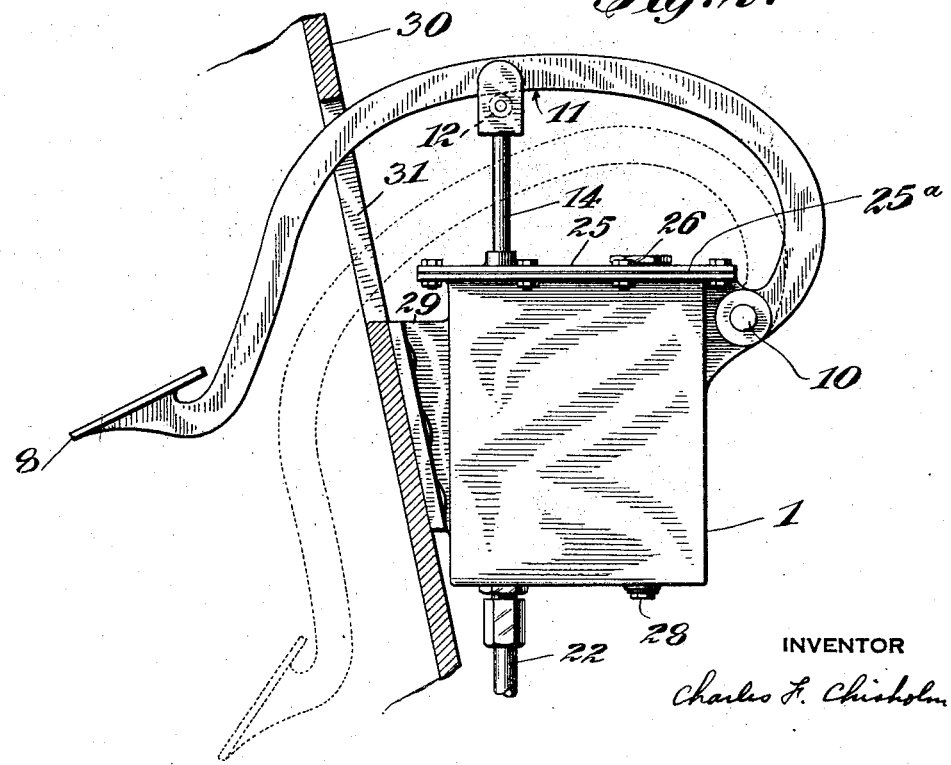
INVENTOR
Charles F. Chisholm Aug. 30, 1932.  C. F. CHISHOLM  1,874,900
AUTOMOTIVE VEHICLE LUBRICATION
Filed Feb. 4, 1929  2 Sheets-Sheet 2
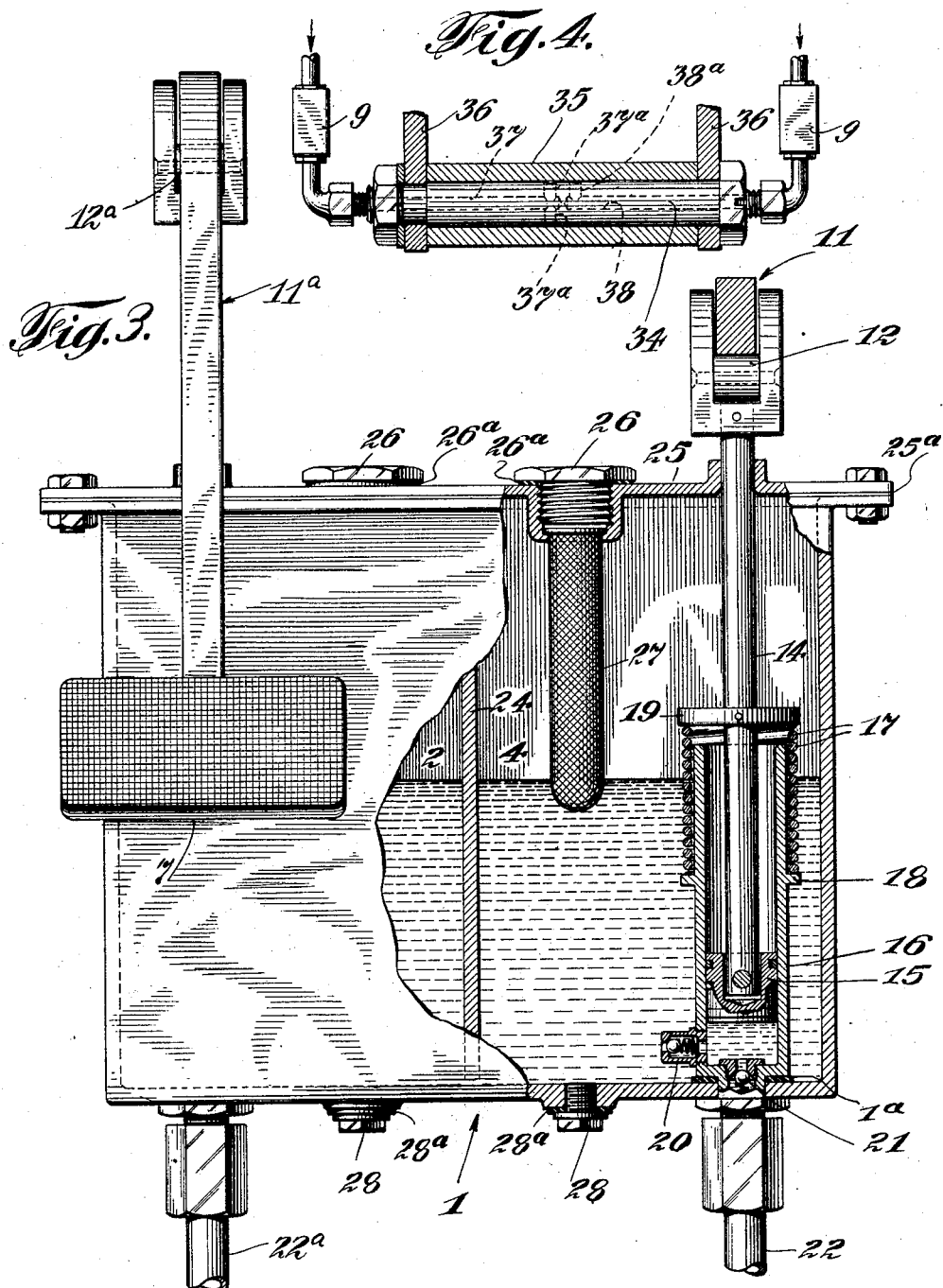
INVENTOR
Charles F. Chisholm Patented Aug. 30, 1932

1,874,900

UNITED STATES PATENT OFFICE

CHARLES F. CHISHOLM, OF STATEN ISLAND, NEW YORK

AUTOMOTIVE VEHICLE LUBRICATION

Application filed February 4, 1929. Serial No. 337,216.

This invention relates to automotive vehicles and particularly to a method of and apparatus for lubricating the chassis of such vehicles.

Heretofore in the art chassis lubrication has usually been effected by the use of hand operated grease guns or the like which are manually applied to various lubricator fittings associated with the bearings to be lubricated. This necessitates the taking of the vehicle to a service station, and the lubrication is troublesome and time consuming. There are a large number of bearings or the like which must be individually lubricated and many of the bearings are in locations which are difficult to reach. Furthermore, many of the lubricator fittings become damaged and the bearings become clogged with dust and hardened grease, thus making it impossible to lubricate them.

Attempts have been made to overcome these difficulties by so-called "one shot" systems of lubrication. In these systems conduits are arranged to conduct oil from a central reservoir to the various chassis bearings; and a pump is used in an attempt to force oil through the conduits to all of the chassis bearings at "one shot." Many of the chassis bearings are exposed to dust (e. g. from the road) and as dust readily adheres to any oily surface, many of the bearings quickly become clogged with dirt and gummed-up oil with the result that little or no oil thereafter reaches those bearings.

The general object of the present invention is to provide a method of (and apparatus for) readily lubricating chassis bearings which insures the delivery of lubricant to the desired points.

Another object of the invention is to overcome the clogging of chassis bearings by dirt and gummed-up lubricant.

A more specific object of the invention is to provide a one shot lubricating system which keeps the bearings free of dirt and gummed-up lubricant, thus insuring proper lubrication.

The invention is disclosed in the form of a "one shot" system in which there are two central reservoirs, one for a solvent such as gasoline, and one for a lubricant such as oil. The central reservoirs are connected respectively to separate systems of conduits and a conduit of each system may run to each of the chassis bearings. These conduit systems may be built up from suitable tubing such as double duct copper tubing or two copper tubes laid side by side, one duct for the solvent and the other for the lubricant. This tubing is either flexible or has flexible sections where needed to permit movement of such bearings as spring shackles. Any suitable pump or pressure device known to the art may be used to force the solvent and lubricant to the bearings and any suitable regulating device known to the art may be used to control the flow to each bearing. The bearings are given a "shot" of solvent to wash out the dirt and gummed-up lubricant, and are then given a shot of fresh lubricant.

Fig. 1 of the drawings is a perspective view showing diagrammatically the central reservoirs and the conduit systems applied to an automobile chassis.

Fig. 2 is a side elevation, partially in section, showing the central reservoirs mounted on the dash of an automobile.

Fig. 3 is a sectional view, partially in elevation, showing the central reservoirs and pumping mechanism.

Fig. 4 is a detail sectional view (diagrammatic in part) showing a spring shackle bearing.

A tank 1 forming two reservoirs 2 and 4 (Fig. 3) is connected to a two-in-one pipe system comprising main lines 5 and 6, and branch lines $5^a$, $5^b$, $5^c$, etc. and $6^a$, $6^b$, and $6^c$, etc., each branch line leading to a chassis bearing. This two-in-one pipe system constitutes two systems of conduits, each of which leads to each chassis bearing. Pumping mechanism actuated by pressure on foot pedal 7 is operable to force a suitable solvent such as gasoline through one system of conduits to each of the chassis bearings. Similar pumping mechanism actuated by foot pedal 8, is operable to force a lubricant such as oil through the other system of conduits to each of the chassis bearings. At 9 each conduit is provided with a suitable control valve to control the quantity of solvent or lubricant (as the case may be) which is delivered to each bearing. This control valve may be of any suitable type, e. g. of the type shown in Fig. 3 of U. S. patent to Cowles 1,693,068, November 27, 1928. In actual practice there will ordinarily be a large number of bearings each of which will be fed by a branch line of the pipe system. For the sake of clarity only a few branch lines have been shown in Fig. 1 but it will be understood that the lubrication of any desired number of bearings is contemplated.

As shown in Fig. 3, the tank 1 comprises a reservoir 2 for a solvent and a reservoir 4 for a lubricant. The two reservoirs are similar and are provided with similar pumping mechanism. Accordingly only the lubricant reservoir and pumping mechanism will be described, reference being had to Figs. 2 and 3.

Foot pedal 8 is pivoted at 10 and has a cam portion at 11 which engages roller 12 mounted at the top of piston rod 14. Piston rod 14 is operatively connected to a suitable fluid tight piston 15, operating in pump cylinder 16. A suitable helical spring 17, compressed between abutment 18 on the pump cylinder and abutment 19 on the piston rod, acts to restore the piston to its uppermost position when pressure is removed from foot pedal 8. As the piston moves upwardly, the pump cylinder is filled with lubricant drawn in through a check valve 20. When it is desired to force lubricant to the chassis bearings pressure is applied to foot pedal 8 and piston 15 moves downwardly forcing the lubricant out through check valve 21 and into conduit 22 which feeds the lubricant system of conduits.

The container 1 is shown as rectangular in form with a partition wall 24 which divides it into two reservoirs. The tank is provided with a cover 25 which may be bolted to the tank and be equipped with suitable filler plugs 26. The filling openings may be provided with strainers 27 (one shown); and each reservoir is preferably provided with a drain plug 28. Suitable gaskets may be provided at 1$^a$, 25$^a$, 26$^a$ and 28$^a$ as is well understood in the art. The reservoirs may be vented by small holes in the filler plugs 26 or by a loose fit where piston rod 14 passes through the cover 25, as is common in the art.

The tank may be provided with a bracket 29 which is bolted to the front of the dash 30 so that the tank is located under the hood of the car. The foot pedals preferably extend through a slot 31 in the dash so as to be conveniently accessible to the driver.

The bearings to be lubricated are provided with suitable ducts to conduct the solvent and lubricant to the bearing surfaces. If desired the bearings can be provided with separate ducts for the solvent and lubricant. In Fig. 4 there is shown a spring shackle bolt 34 which is embraced by a tubular element 35 which may be the end of a spring leaf or a bushing in the end of a spring leaf. Hanger bars 36 are arranged in the usual manner. The solvent conduit discharges into a solvent duct 37 extending axially of the bolt 34, and the duct 37 has one or more branch ducts 37$^a$ which lead to the bearing surface. Similarly, the lubricant conduit discharges into a lubricant duct 38 having one or more branches 38$^a$ which lead to the bearing surface.

The chassis is preferably lubricated at regular intervals during the life of the vehicle, e. g. after every one hundred miles of service. Pressure is first applied to foot pedal 7, thus forcing solvent to the bearings and cleansing them. Preferably time is allowed to elapse sufficient to permit most of the solvent to work out of the bearings. If a solvent such as gasoline is used, this will take place in a relatively short time. Then pressure is applied to foot pedal 8, thus forcing a fresh shot of lubricant to each bearing.

Under some conditions of service it may not be necessary to use the solvent at each lubrication. For example, if the vehicle is not exposed to much dirt and dust it may suffice to use the solvent at only every second or third lubrication of the chassis.

Likewise, some vehicles have some of the bearings so located that they do not get clogged with dirt and dust. In such cases, the solvent conduits can be omitted from those bearings.

For convenience I have used the common parlance of "chassis bearings" to denote the points to be lubricated without regard to whether or not the points to be lubricated are technically part of the chassis or technically conventional bearings. Any point to be lubricated has a bearing surface and for convenience I have used the term "bearing" to include all such points. When I speak of a plurality of bearings each being supplied with a solvent and with a lubricant, I include a case where there may be additional bearings which are not supplied with a solvent. I also include a case where the vehicle may have certain bearings which are not lubricated by the one shot system and are lubricated by other means.

By means of the present invention the bearing may be kept comparatively clean and hence heavy oils such as gear oil may be used for lubrication. This is advantageous, because such oils have sufficient body to prevent the bearing surfaces from being forced into actual contact, and they remain in the bearings a long time. Of course the pumps, valves, conduits, etc., are to be designed in any given case to advantageously handle the particular liquid that is to be used.

The invention may be embodied in forms other than particularly disclosed, and hence the disclosure is merely illustrative in compliance with the patent statutes, and is not to be considered as limiting the invention.

Having thus disclosed my invention, I claim:

1. In an automotive vehicle, a plurality of chassis bearings, a central solvent reservoir, means to force solvent from the solvent reservoir to said bearings, a central lubricant reservoir, and means to force lubricant from the lubricant reservoir to said bearings.

2. In an automotive vehicle, a plurality of chassis bearings, a central solvent reservoir, means to deliver solvent from the solvent reservoir to said bearings, a central lubricant reservoir, and means to deliver lubricant from the lubricant reservoir to said bearings.

3. In an automotive vehicle, a plurality of chassis bearings, a central solvent reservoir, a central lubricant reservoir, conduits to separately conduct solvent and lubricant from said reservoirs to said bearings, said conduits including means to separately regulate the quantity of solvent and lubricant delivered to the bearings, and means to separately force solvent and lubricant from the reservoirs to the bearings.

4. In an automotive vehicle, a plurality of chassis bearings, a central solvent reservoir, a central lubricant reservoir, conduit means to conduct solvent and lubricant from said reservoirs to said bearings, said conduit means including means to regulate the quantity of solvent and lubricant delivered to said bearings, and means to force solvent and lubricant from the reservoirs to the bearings.

5. In an automotive vehicle, a bearing having at least two ducts leading to the bearings surface, and means to deliver a solvent to one duct and a lubricant to the other duct.

CHARLES F. CHISHOLM.